US011501111B2

(12) United States Patent
Qian et al.

(10) Patent No.: US 11,501,111 B2
(45) Date of Patent: Nov. 15, 2022

(54) LEARNING MODELS FOR ENTITY RESOLUTION USING ACTIVE LEARNING

(71) Applicant: International Business Machines Corporation, Armonk, NY (US)

(72) Inventors: Kun Qian, San Jose, CA (US); Lucian Popa, San Jose, CA (US); Prithviraj Sen, San Jose, CA (US); Min Li, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1259 days.

(21) Appl. No.: 15/947,166

(22) Filed: Apr. 6, 2018

(65) Prior Publication Data

US 2019/0311229 A1 Oct. 10, 2019

(51) Int. Cl.
  *G06K 9/62* (2022.01)
  *G06N 5/02* (2006.01)
  *G06N 20/00* (2019.01)

(52) U.S. Cl.
  CPC ......... *G06K 9/6259* (2013.01); *G06K 9/6254* (2013.01); *G06K 9/6263* (2013.01); *G06N 5/025* (2013.01); *G06N 20/00* (2019.01)

(58) Field of Classification Search
  CPC .. G06K 9/6259; G06K 9/6254; G06K 9/6263; G06N 20/00; G06N 5/025
  USPC ......................................................... 706/59
  See application file for complete search history.

(56) References Cited

U.S. PATENT DOCUMENTS

| 8,611,505 B2 | 12/2013 | Oppenheim et al. |
| 8,949,241 B2 | 2/2015 | Olof-Ors et al. |
| 9,063,926 B2 | 6/2015 | Crestani Campos et al. |
| 9,189,473 B2 | 11/2015 | Galle et al. |

(Continued)

FOREIGN PATENT DOCUMENTS

| CN | 104573130 A | 4/2015 |
| CN | 105260746 A | 1/2016 |

(Continued)

OTHER PUBLICATIONS

Kooli et al., "Deep Learning Based Approach for Entity Resolution in Databases", Research Gate, Jan. 2018.

(Continued)

*Primary Examiner* — Sath V Perungavoor
*Assistant Examiner* — Kristin Dobbs
(74) *Attorney, Agent, or Firm* — Ryan, Mason & Lewis, LLP

(57) ABSTRACT

Methods, systems, and computer program products for learning models for entity resolution using active learning are provided herein. A computer-implemented method includes determining a set of data items related to a task associated with structured knowledge base creation, and outputting the set of data items to a user for labeling. Such a method also includes generating, based on a user-labeled version of the set of data items, a candidate model for executing the task, and one or more generalized versions of the candidate model. Additionally, such a method can also include generating a final model based on one or more iterations of analysis of the candidate model and analysis of the one or more generalized versions of the candidate model, and performing the task by executing the final model on one or more datasets.

25 Claims, 8 Drawing Sheets

(56) References Cited

U.S. PATENT DOCUMENTS

| | | | |
|---|---|---|---|
| 9,535,902 | B1 | 1/2017 | Michalak et al. |
| 9,652,452 | B2 | 5/2017 | Iverson |
| 9,678,957 | B2 | 6/2017 | Cormack et al. |
| 9,734,207 | B2 * | 8/2017 | Goeppinger ........... G06N 7/005 |
| 10,169,331 | B2 | 1/2019 | Baron-Palucka et al. |
| 10,180,969 | B2 | 1/2019 | Trudel et al. |
| 10,303,771 | B1 | 5/2019 | Jezewski |
| 2003/0191625 | A1 | 10/2003 | Gorin et al. |
| 2013/0185314 | A1 | 7/2013 | Rubinstein et al. |
| 2013/0317806 | A1 | 11/2013 | Crestani Campos et al. |
| 2015/0269494 | A1 | 9/2015 | Kardes et al. |
| 2016/0012020 | A1 | 1/2016 | George et al. |
| 2016/0328386 | A1 | 11/2016 | Cross, III et al. |
| 2016/0378765 | A1 | 12/2016 | Bernstein et al. |
| 2017/0032249 | A1 | 2/2017 | Chougule et al. |
| 2017/0075918 | A1 | 3/2017 | Bates-Haus et al. |
| 2017/0098013 | A1 | 4/2017 | Shirwadkar et al. |
| 2018/0011837 | A1 | 1/2018 | Beller et al. |
| 2018/0121500 | A1 | 5/2018 | Reschke et al. |
| 2018/0144003 | A1 | 5/2018 | Formoso et al. |
| 2018/0232601 | A1 | 8/2018 | Feng et al. |
| 2018/0314729 | A9 | 11/2018 | Reschke et al. |
| 2018/0330280 | A1 * | 11/2018 | Erenrich ................ G06N 20/00 |
| 2019/0171944 | A1 | 6/2019 | Lu |
| 2019/0251172 | A1 | 8/2019 | Jezewski et al. |
| 2019/0318261 | A1 | 10/2019 | Deng et al. |
| 2019/0361961 | A1 | 11/2019 | Zambre et al. |
| 2020/0252600 | A1 | 8/2020 | Tseng et al. |
| 2021/0056388 | A1 | 2/2021 | Karg et al. |

FOREIGN PATENT DOCUMENTS

| | | |
|---|---|---|
| CN | 107210035 A | 9/2017 |
| GB | 2536898 A | 10/2016 |
| WO | 2009086311 A1 | 7/2009 |
| WO | 2018077401 A1 | 5/2018 |

OTHER PUBLICATIONS

Mudgal et al. Deep Learning for Entity Matching: A design Space exploration. SIGMOD 2018.
Ebraheem et al. Distributed Representations of Tuples for Entity Resolution. VLDB 2018.
Qian et al., Active Learning for Large-Scale Entity Resolution. CIKM 2017.
Christen et al., 2015. Efficient Entity Resolution with Adaptive and Interactive Training Data Selection. In ICDM. 1550-4786.
Konda et al., 2016. Magellan: Toward building entity matching management systems.VLDB9:1197-1208.
Arasu et al., 2010. On active learning of record matching packages. In SIGMOD.
Bilenko et al., 2003. Adaptive duplicate detection using learnable string similarity measures. In KDD, 39-48. New York, NY, USA: ACM.
Bird et al., 2009. Natural Language Processing with Python. OReilly Media.
Bojanowski et al., 2017. Enriching word vectors with subword information. TACL 5:135-146.
Chen et al., 2018. Big gorilla: an open-source ecosystem for data preparation and integration. IEEE Data Engineering Bulletin, Special Issue on Data Integration.
Cho et al., 2014. Learning phrase representations using rnn encoder-decoder for statistical machine translation. In EMNLP.
Christen, P. 2008. Febrl: A freely available record linkage system with a graphical user interface. In Proceedings of the Second Australasian Workshop on Health Data and Knowledge Management—vol. 80, HDKM '08, 17-25.
Das et al., 2016. The Magellan data repository. https://sites.google.com/site/anhaidgroup/useful-stuff/data.
De Freitas et al., 2010. Active learning genetic programming for record deduplication. IEEE Congress on Evolutionary Computation 1-8.
Dong et al., 2005. Reference reconciliation in complex information spaces. In SIGMOD, 85-96. New York, NY, USA ACM.
Elman, J. L. 1990. Finding structure in time. Cognitive Science 14:179-211.
Fagin et al., 2009. Clio: Schema mapping creation and data exchange. In Conceptual Modeling: Foundations and Applications.
Fellegi et al., 1969. "A theory for record linkage," Journal of the American Statistical Association, vol. 64, No. 328, pp. 1183-1210, 1969.
Ganin et al., 2015. Unsupervised domain adaptation by backpropagation. Proceedings of the 32nd International Conference on Machine Learning, vol. 37 of Proceedings of Machine Learning Research, 1180-1189.
Hernandez et al., 1995. The merge/purge problem for large databases. In SIGMOD, 127-138. New York, NY, USA.
Hochreiter et al., 1997. Long short-term memory. Neural Computation 9:1735-1780.
Isele et al., 2012. Learning of expressive linkage rules using genetic programming. Proceedings of the VLDB Endowment, vol. 5, No. 11.
Isele et al., 2013. Active learning of expressive linkage rules using genetic programming. Journal of Web Semantics.
Kingma et al., 2015. ADAM: A Method for Stochastic Optimization. In ICLR.
Kopcke et al., 2010. Evaluation of entity resolution approaches on real-world match problems. VLDB.
Kremer et al., 2014. Active learning with support vector machines. Wiley Interdisc. Rew.: Data Mining and Knowledge Discovery 4:313-326.
Paszke et al., 2017. Automatic differentiation in pytorch. In NIPS 2017 Autodiff Workshop.
Pennington et al., 2014. Glove: Global vectors for word representation. In EMNLP.
Rahm et al., 2001. A survey of approaches to automatic schema matching. VLDB Journal 10:334-350.
Sarawagi et al., 2002. Interactive deduplication using active learning. In KDD.
Srivastava et al., 2015. Training very deep networks. In NIPS.
Tejada et al., 2001. Learning object identification rules for information integration. Inf. Syst. 26:607-633.
Wang et al., 2011. Entity matching: How similar is similar. VLDB 4(10):622-633.
Wang et al., 2017. Cost-effective active learning for deep image classification. IEEE Trans. Cir. and Sys. for Video Technol. 27(12):2591-2600.
Arasu et al. On Active Learning of Record Matching Packages. In SIGMOD 2010.
S. Sarawagi and A. Bhamidipaty. 2002. Interactive Deduplication Using Active Learning. In KDD. 269-278.
J. de Freitas, G. Pappa, A. da Silva, M. Gonc,alves, E. Moura, A Veloso, A. Laender, M. de Carvalho. 2010. Active Learning Genetic programming for record deduplication. In IEEE Congress on Evolutionary Computation. 1-8.
R. Isele and C. Bizer. 2013. Active Learning of Expressive Linkage Rules using Genetic Programming. Web Semantics: Science, Services and Agents on the World Wide Web (2013), 2-15.
S. Tejada, C. Knoblock, and S. Minton. 2001. Learning Object Identification Rules for Information Integration. Information Systems (2001), 607-633.
P. Christen, D. Vatsalan, and Q. Wang. 2015. Efficient Entity Resolution with Adaptive and Interactive Training Data Selection. In ICDM. 1550-4786.
G. Dal Bianco, R. Galante, M. Gonsalves, S. Canuto, and C. Heuser. 2015. A Practical and Effiective Sampling Selection Strategy for Large Scale Deduplication. IEEE TKDE (2015), 2305-2319.
K. Bellare, S. Lyengar, A. Parameswaran, and V. Rastogi. KDD 2012. Active Sampling for Entity Matching.
B. Mozafari, P. Sarkar, M. Franklin, M. Jordan, and S. Madden. VLDB 2014. Scaling up crowd-sourcing to very large datasets: a case for active learning.
Koudas et al., "Record linkage: similarity measures and algorithms," in SIGMOD. ACM, 2006, pp. 802-803.

(56) References Cited

OTHER PUBLICATIONS

D. Angluin. 1988. Queries and Concept Learning. Machine Learning (1988), 319-342.

S. Bach, M. Broecheler, B. Huang, and L. Getoor. 2015. Hinge-Loss Markov Random Fields and Probabilistic Soft Logic CoRR (2015). arXiv:abs/1505.04406.

A. Beygelzimer, J. Langford, T. Zhang, and D. Hsu. 2010. Agnostic Active Learning Without Constraints. In NIPS. 199-207.

M. Bilenko, B. Kamath, and R. Mooney. 2006. Adaptive blocking: Learning to scale up record linkage. In Workshop on Information Integration on the Web. 87-96.

S. Dasgupta and D. Hsu. 2008. Hierarchical Sampling for Active Learning. In ICML. 208-215.

G. Demartini, D. Difallah, and P. Cudre-Mauroux. 2013. Large-scale Linked Data Integration using Probabilistic Reasoning and Crowdsourcing. VLDB Journal (2013), 665-687.

X. Dong, A. Halevy, and J. Madhavan. 2005. Reference Reconciliation in Complex Information Spaces. In SIGMOD. 85-96.

B. Efron and R. Tibshirani. 1993. An Introduction to the Bootstrap. Chapman & Hall.

I. Fellegi and A. Sunter. 1969. A Theory for Record Linkage. J. Amer. Statist. Assoc. (1969), 1183-1210.

J. Fisher, P. Christen, and Q.Wang. 2016. Active Learning Based Entity Resolution using Markov Logic. In PAKDD. 338-349.

Y. Freund, H. Seung, E. Shamir, and N. Tishby. 1997. Selective sampling using the query by committee algorithm. Machine Learning (1997), 133-168.

L. Getoor and A. Machanavajjhala. 2013. Entity Resolution for Big Data.

O. Goga, P. Loiseau, R. Sommer, R. Teixeira, and K. Gummadi. 2015. On the reliability of profile matching across large online social networks. In KDD. 1799-1808.

M. Hernández, G. Koutrika, R. Krishnamurthy, L. Popa, and R. Wisnesky. 2013. HIL: A High-level Scripting Language for Entity Integration. In EDBT. 549-560.

M. Hernández and S. Stolfo. 1995. The Merge/Purge Problem for Large Databases. In SIGMOD. 127-138.

Matti Kääriäinen. 2006. Active Learning in the Non-realizable Case. 63-77.

A. Khan and H. Garcia-Molina. 2016. Attribute-based Crowd Entity Resolution. In CIKM. 549-558.

S. Kok and P. Domingos. 2010. Learning Markov logic networks using structural motifs. In ICML. 551-558.

H. Köpcke and E. Rahm. 2008. Training selection fortuning entity matching. In QDB/MUD. 3-12.

M. Michelson and C. Knoblock. 2006. Learning Blocking Schemes for Record Linkage. In AAAI 440-445.

M. Motoyama and G. Varghese. 2009. I seek you: Searching and matching individuals in social networks. In Workshop on Web Information and Data Management. 67-75.

M. Richardson and P. Domingos. 2006. Markov logic networks. Machine Learning Journal (2006), 107-136.

H. Seung, M. Opper, and H. Sompolinsky. 1992. Query by committee. In COLT. 287-294.

P. Singla and P. Domingos. 2006. Entity Resolution with Markov Logic. In ICDM. 572-582.

V. Vapnik. 1995. The Nature of Statistical Learning Theory. Springer-Verlag.

V. Verroios and H. Garcia-Molina. 2015. Entity Resolution with Crowd Errors. In ICDE. 219-230.

N. Vesdapunt, K. Bellare, and N. Dalvi. 2014. Crowdsourcing algorithms for entity resolution. In VLDB. 1071-1082.

J. Wang, T. Kraska, M. Franklin, and J. Feng. 2012. CrowdER: Crowdsourcing Entity Resolution. PVLDB (2012), 1483-1494.

S. Whang, P. Lofgren, and H. Garcia-Molina. 2013. Question Selection for Crowd Entity Resolution. In VLDB. 349-360.

G. You, S. Hwang, Z. Nie, and J. Wen. 2011. SocialSearch: Enhancing Entity Search with Social Network Matching. In EDBT. 515-519.

Nadeau, David, "Semi-Supervised Named Entity Recognition: Learning to Recognize 100 Entity Types with Little Supervision," Thesis, University of Ottawa, 2007.

Thompson et al., "The BioLexicon: A Large-Scale Terminological Resource for Biomedical Text Mining," BMC Bioinformatics 12.1 (2011):397.

Arasu et al., 2009. A grammar-based entity representation framework for data cleaning. In Proceedings of the 2009 ACM SIGMOD International Conference on Management of data, pp. 233-244. ACM.

Arasu et al., 2008. Transformation-based framework for record matching. In Data Engineering, 2008. ICDE 2008. IEEE 24th International Conference on, pp. 40-49. IEEE.

Arasu et al., 2009. Learning string transformations from examples. Proceedings of the VLDB Endowment, 2:514-525.

Auer et al., 2007. Dbpedia: A nucleus for a web of open data. In The semantic web, pp. 722-735. Springer.

Bartoli et al., 2012. Automatic generation of regular expressions from examples with genetic programming. In Proceedings of the 14th annual conference companion on Genetic and evolutionary computation, pp. 1477-1478. ACM.

Berant et al., 2013. Semantic parsing on freebase from question-answer pairs. In EMNLP, vol. 2, p. 6.

Steven Bethard. 2013. A synchronous context free grammar for time normalization. In EMNLP, pp. 821-826.

Bollacker et al., 2008. Freebase: a collaboratively created graph database for structuring human knowledge. In Proceedings of the 2008 ACM SIGMOD international conference on Management of data, pp. 1247-1250. ACM.

Carlson et al., 2010. Toward an architecture for never-ending language learning. In AAAI, vol. 5, p. 3.

Peter Christen. 2012. A survey of indexing techniques for scalable record linkage and deduplication. IEEE transactions on knowledge and data engineering, 24(9):1537-1555.

Culotta et al., 2005. Reducing labeling effort for structured prediction tasks. In AAAI, vol. 5, pp. 746-751.

Dredze et al., 2010. Entity disambiguation for knowledge base population. In COLING.

D'Souza et al., 2015. Sieve-based entity linking for the biomedical domain. In ACL (2), pp. 297-302.

Elmagarmid et al., 2007. Duplicate record detection: A survey. IEEE Transactions on knowledge and data engineering, 19(1):1-16.

Fader et al., 2011. Identifying relations for open information extraction. In Proceedings of the Conference on Empirical Methods in Natural Language Processing, pp. 1535-1545. Association for Computational Linguistics.

Finkel et al., 2009. Nested named entity recognition. In Proceedings of the 2009 Conference on Empirical Methods in Natural Language Processing: vol. 1-vol. 1, pp. 141-150. Association for Computational Linguistics.

Galarraga et al., 2014. Canonicalizing open knowledgebases. In Proceedings of the 23rd ACM International Conference on Conference on Information and Knowledge Management, pp. 1679-1688. ACM.

Halevy et al., 2016. Discovering structure in the universe of attribute names. In Proceedings of the 25th International Conference on World Wide Web, pp. 939-949. International World Wide Web Conferences Steering Committee.

Han et al., 2011. Collective entity linking in web text: a graph-based method. In Proceedings of the 34th international ACM SIGIR conference on Research and development in Information Retrieval, pp. 765-774. ACM.

Hoffmann et al., 2011. Knowledge-based weak supervision for information extraction of overlapping relations. In Proceedings of the 49th Annual Meeting of the Association for Computational Linguistics: Human Language Technologies—vol. 1, pp. 541-550. Association for Computational Linguistics.

Lee et al., 2014. Context-dependent semantic parsing for time expressions. In ACL (1), pp. 1437-1447.

Lehmann et al., 2010. Lcc approaches to knowledgebase population at tac 2010. In TAC.

(56) References Cited

OTHER PUBLICATIONS

Li et al., 2008. Regular expression learning for information extraction. In Proceedings of the Conference on Empirical Methods in Natural Language Processing, pp. 21-30. Association for Computational Linguistics.

Xiao Li. 2010. Understanding the semantic structure of noun phrase queries. In Proceedings of the 48th Annual Meeting of the Association for Computational Linguistics, pp. 1337-1345. Association for Computational Linguistics.

Liu et al., 2013. Entity linking for tweets. In ACL (1), pp. 1304-1311.

McCallum et al., 2000. Efficient clustering of high-dimensional data sets with application to reference matching. In Proceedings of the sixth ACM SIGKDD international conference on Knowledge discovery and data mining, pp. 169-178. ACM.

Nakashole et al., 2011. Scalable knowledge harvesting with high precision and high recall. In Proceedings of the fourth ACM international conference on Web search and data mining, pp. 227-236. ACM.

Qian et al., 2017. Active learning for large-scale entity resolution. In Proceedings of the 2017 ACM on Conference on Information and Knowledge Management, CIKM '17, pp. 1379-1388, New York, NY, USA. ACM.

Qian et al., 2018. Lustre: An interactive system for entity structured representation and variant generation. In Data Engineering (ICDE), 2018 IEEE 34th International Conference on. IEEE.

Riedel et al., 2010. Modeling relations and their mentions without labeled text. In Joint European Conference on Machine Learning and Knowledge Discovery in Databases, pp. 148-163. Springer.

Settles et al., 2008. An analysis of active learning strategies for sequence labeling tasks. In Proceedings of the conference on empirical methods in natural language processing, pp. 1070-1079. Association for Computational Linguistics.

Shen et al., 2015. Entity linking with a knowledge base: Issues, techniques, and solutions. IEEE Transactions on Knowledge and Data Engineering, 27(2):443-460.

Singh et al., 2012. Learning semantic string transformations from examples. Proceedings of the VLDB Endowment, 5:740-751.

Ace 2005 multilingual training corpus. Linguistic Data Consortium, Philadelphia, 2006.

Xu et al., 2013. Filling knowledge base gaps for distant supervision of relation extraction. In ACL (2), pp. 665-670.

Zhang et al., 2010. Nus-i2r: Learning a combined system for entity linking. In TAC.

Zheng et al., 2010. Learning to link entities with knowledgebase. In Human Language Technologies: The 2010 Annual Conference of the North American Chapter of the Association for Computational Linguistics, pp. 483-491. Association for Computational Linguistics.

SAP, SAP HANA Variant Generation, https://help.sap.com/viewer/650b1af302924b3d85ec109e325edf93/2.0.00/en-US/57b1fcc36d6d1014b3fc9283b0e91070.html, 2017.

Johannes Hoffart, Fabian M Suchanek, Klaus Berberich, and Gerhard Weikum. 2013. YAGO2: A spatially and temporally enhanced knowledge base from Wikipedia. Artificial Intelligence 194 (2013), 28-61.

David D Lewis and Jason Catlett. 1994. Heterogeneous uncertainty sampling for supervised learning. In Machine Learning Proceedings 1994. Elsevier, 148-156.

Peter Mell, et al. The NIST Definition of Cloud Computing, Recommendations of the National Institute of Standards and Technology, US Department of Commerce, Special Publicaiton 800-145, Sep. 2011, pp. 1-7.

Qian, Kun. Discovering Information Integration Specifications from Data Examples, UC Santa Cruz, US Santa Cruz Electronic Theses and Dissertations, https://escholarship.org/uc/item/3271w6hm, 2017, pp. 1-216.

List of IBM Patents or Patent Applications Treated as Related, Aug. 10, 2020, pp. 1-2.

\* cited by examiner

302

---

Algorithm 1: LearnRule($T, \tau$)
---

Input: Set of labeled feature vectors $T$, precision threshold $\tau$
1:   $T^+ \leftarrow \{\langle F, y \rangle | \langle F, y \rangle \in T, y = \text{match}\}$
2:   best.$R \leftarrow$ false; best.covg $\leftarrow 0$      /* stores best rule */
3:   for $\langle F, y \rangle \in T^+$ do      /* iterate over each match (r, s) */
4:      $R \leftarrow$ true
5:      for $i \in 1, ... N$ do      /* select all true predicates */
6:         if $F_i$ then $R \leftarrow R \wedge P_i$      /* where $F_i = P_i(r, s)$ */

7:      $(R', \text{covg}) \leftarrow$ Generalize($R, T, t$)
8:      if covg > best.covg then
9:         best.$R \leftarrow R'$; best.covg $\leftarrow$ covg 10: return best.$R$

LEARNING MODELS FOR ENTITY RESOLUTION USING ACTIVE LEARNING

FIELD

The present application generally relates to information technology, and, more particularly, to data analytics.

BACKGROUND

Many data analytic applications are powered by structured knowledge bases. To create a high-quality structured knowledge base, tasks such as entity resolution, relationship identification, etc. are commonly carried out. Such tasks can be captured, semantically, by data items that meet user requirements. However, in conventional approaches, developing models that capture the semantic definitions of such tasks is an error-prone, labor-intensive process.

SUMMARY

In one embodiment of the present invention, techniques for implementing learning models for entity resolution using active learning are provided. An exemplary computer-implemented method can include determining, from one or more datasets, a set of example data items related to a task associated with structured knowledge base creation, and outputting the determined set of example data items to at least one user for labeling. Such a method can also include generating, based on a user-labeled version of the determined set of example data items, a candidate model for executing the task, and generating, based on the user-labeled version of the determined set of example data items, one or more generalized versions of the candidate model, wherein each of the one or more generalized versions of the candidate model encompasses a superset of data items encompassed by the candidate model. Additionally, such a method can include analyzing the candidate model for one or more data items accepted by the candidate model and having at least a given probability of being incorrectly accepted with respect to the task, and analyzing the one or more generalized versions of the candidate model for one or more data items not accepted by the candidate model and having at least a given probability of being correctly accepted with respect to the task. Further, such a method can also include generating a final model based on one or more iterations of the analysis of the candidate model and the analysis of the one or more generalized versions of the candidate model, and performing the task by executing the final model on the one or more datasets.

In another embodiment of the invention, an exemplary computer-implemented method can include generating one or more generalized versions of an existing candidate model for executing a task associated with structured knowledge base creation across one or more datasets, wherein each of the one or more generalized versions of the candidate model encompasses a superset of data items encompassed by the existing candidate model. Such a method can also include outputting, to at least one user for labeling, (i) the data items encompassed by the existing candidate model and (ii) the superset of data items encompassed by each of the one or more generalized versions of the existing candidate model. Further, such a method can include generating, based on user-labeling of (i) the data items encompassed by the existing candidate model and (ii) the superset of data items encompassed by each of the one or more generalized versions of the existing candidate model, a revised version of the existing candidate model for executing the task. Such a method additionally includes performing the task by executing the revised version of the existing candidate model on the one or more datasets.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 3 is a diagram illustrating a single-rule learning algorithm, according to an exemplary embodiment of the invention;

DETAILED DESCRIPTION

Figure 1:
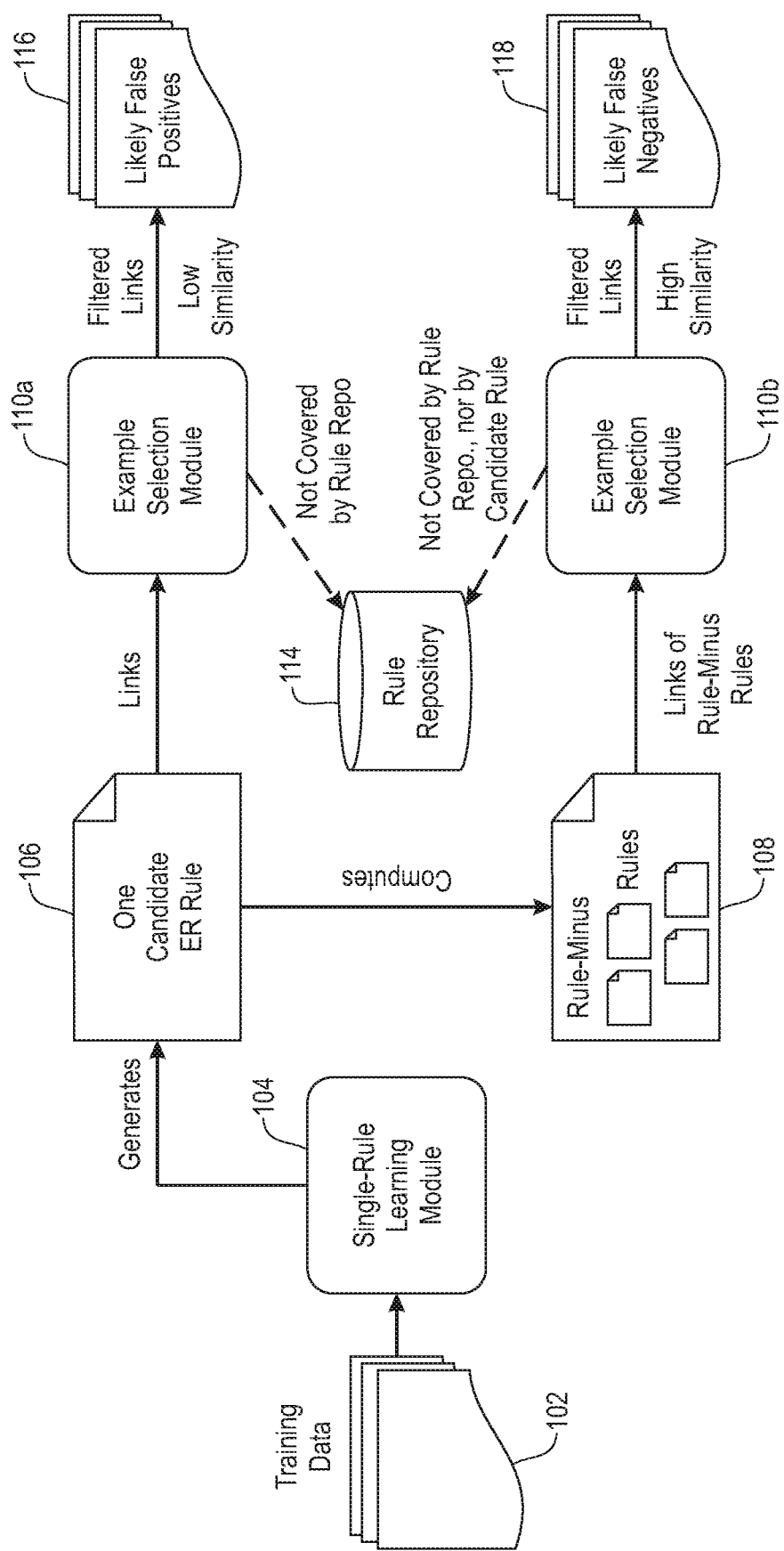
FIG. 1 is a system diagram for automatic rule learning and example generation, according to an exemplary embodiment of the invention.

As described herein, an embodiment of the present invention includes learning high-precision and high-recall models for large-scale entity resolution using active learning. As used herein, entity resolution (ER) refers to the task of identifying different representations of the same real-world object across datasets. At least one embodiment of the invention includes generating and/or implementing an active system to learn high-quality models for sub-tasks used in structured knowledge base creation. As is to be appreciated, one or more embodiments of the invention are described herein in the context of entity resolution; yet entity resolution is merely one example task of multiple potential tasks related to structured knowledge base creation.

As such, at least one embodiment of the invention includes identifying, from one or more potentially massive datasets (for example, tens of millions of records), a sub-set of informative examples to be labeled by the user. Additionally, such an embodiment can include using the labeled examples to efficiently learn ER algorithms that achieve both high precision and high recall, and executing the learned algorithm to determine duplicates at scale. For example, such an embodiment can include generating an outcome of an ER model that produces pairs of entities that are considered to be equivalent across two or more datasets.

As detailed herein, one or more embodiments of the invention include searching for both false positives and false negatives within large datasets which may contain diverse attributes varying in sparsity (that is, some attributes may be present in some records, while other attributes appear in other records). In such situations, learning just one rule may not achieve an acceptable level of recall; it is often advantageous and/or necessary to learn multiple high-precision rules, each exploiting a different combination of attributes present in the data. Accordingly, while false positives can help refine a rule, false negatives can be utilized for learning multiple rules.

For example, false negative examples can enable a learning algorithm to form new combinations of matching conditions and exploit new attributes (for example, email and social network screen handles and/or identifiers). In determining and/or identifying false negatives with large datasets, one or more embodiments of the invention can include generating and/or implementing a novel rule-minus heuristic that actively searches for false negatives by systematically removing one or more conditions from an existing rule.

The class of ER algorithms that can be learned can be expressed, for example, as disjunctions of conjunctions of atomic predicates, wherein the predicates range from basic equalities on attributes to more complex, similarity or threshold-based comparison functions, and can also use filters and normalization functions. Additionally, one or more embodiments of the invention include learning such algorithms at scale, which can include executing ER rules using distributed infrastructure.

By way of illustration, with respect to the entity resolution learning problem, assume that the ER task in consideration has two input datasets, denoted by $D_1$ and $D_2$. One or more embodiments of the invention can include using $(r,s) \in D_1 \times D_2$ to denote a pair of records (in short, a pair) in the cross-product of $D_1$ and $D_2$. An entity resolution algorithm A is a disjunction of rules $R_1 \vee \ldots \vee R_k$, wherein each $R_i$ is a conjunction $P_1^i \wedge \ldots \wedge P_{m_i}^i$ of matching predicates. Syntactically, an ER algorithm can be written as follows:

match $D_1 r$, $D_2 s$ by $R_1: P_1^1(r, s)$ AND ... AND $P_{m_1}^1(r, s)$,

...

$R_k: P_1^k(r, s)$ AND ... AND $P_{m_k}^k(r, s)$.

Given a set of pre-defined atomic functions (for equality, comparisons of strings, normalization, filtering, etc.), it is possible to systematically enumerate all of the matching predicates relevant to the ER task at hand. Care must be taken to ensure syntactic validity (that is, certain functions may only apply to certain attributes in the schemas, compositions of functions must type-check) and to avoid repeated application of the same normalization function within a matching predicate (which would lead to compositions of unbounded length). By way of illustration, let $O = \langle P_1, \ldots, P_N \rangle$ denote a fixed permutation of all matching predicates relevant for $D_1$, $D_2$. Also, $F(r,s) = \langle P_1(r,s), P_2(r,s), \ldots, P_N(r,s) \rangle$ denotes the feature vector corresponding to the pair $(r, s)$. Here, the value of the $k^{th}$ feature in $F(r, s)$ is the evaluation of $P_k \in O$ on pair $(r, s)$. Note that each feature is Boolean (that is, 0/1, or false/true). According, one or more embodiments of the invention include generating feature vectors on demand.

Additionally, at least one embodiment of the invention can include avoiding learning any rule R that may require enumerating $D_1 \times D_2$, wherein such a task is accomplished by ensuring that each rule R contains at least one blocking predicate which is a matching predicate that has the additional property of logically partitioning the input datasets into smaller blocks of records so that R only compares records within the same block. It can be assumed that blocking predicates in O have been pre-identified, and a learning algorithm of one or more embodiments of the invention will only generate rules that include at least one of these blocking predicates.

For active learning of ER algorithms, at least one embodiment of the invention includes estimating the quality of learned rules. Such an embodiment can include using metrics of precision and recall. Note that pair $(r, s)$ can be referred to herein as a link of R if the pair satisfies all matching predicates in R. One or more embodiments of the invention can also include denoting, by $links(R) \subseteq D_1 \times D_2$, the set of all links resulting from applying rule R on $D_1$, $D_2$. If a human user identifies a pair $(r, s)$ as a pair of duplicates, then such a pair is referred to as a match, otherwise the pair is a non-match. A true positive of R is a link of R that is a match, while a false positive is one that is a non-match. A false negative of R is a match that is not present in links(R). Additionally, as used herein, let TP(R), FP(R), FN(R) denote the number of true positives, false positives, and false negatives of R, respectively. Accordingly, in one or more embodiments of the invention, precision and recall can be defined as:

$$Prec(R) = \frac{TP(R)}{TP(R) + FP(R)}, \text{Recall}(R) = \frac{TP(R)}{TP(R) + FN(R)}$$

Additionally, the above definitions can be extended to an ER algorithm A, via links $(A) = U_{R \in A}$ links (R).

As also detailed herein, one or more embodiments of the invention include learning entity resolution algorithms. By way of illustration, let $\tau \in [0, 1]$ be a precision threshold. A goal of ER learning can include determining an algorithm A that maximizes recall while each rule $R \in A$ has precision higher than $\tau$:

maxRecall(A) such that $Prec(R) \geq \tau, \forall R \in A$

At least one embodiment of the invention can also include estimating precision and recall. The above notions of precision and recall can be defined, for example, with respect to the actual datasets $D_1$ and $D_2$. An exact calculation of recall, for instance, can include labeling (as a match or a non-match) of all pairs in $D_1 \times D_2$, which may not be feasible in practice. During active learning, one or more embodiments of the invention can include gauging the precision and recall of the candidate rules, while asking the user to label only a limited number of pairs. As used herein, a pair $(r, s)$ that is presented to the user for labeling is referred to as an example. An example is called positive if labeled as a match by the user, and negative otherwise.

Given that a rule R may return thousands of links or more, especially in big data scenarios, it is infeasible to estimate precision by labeling all of links (R). As such, at least one embodiment of the invention can include obtaining an estimate of Prec(R) by selecting a sub-set of links of R that have low confidence. Intuitively, this represents an adversarial set of examples; if R has high precision on this small adversarial set, then it is likely to have at least the same precision on a randomly selected set of links of R.

With respect to estimating relative recall of rules, at least one embodiment of the invention can include illustrating that the number of links can be a sufficient estimate of the recall as the precision threshold approaches one. More concretely, rules with a higher link count are estimated to have higher recall, given the precision constraint.

In one or more embodiments of the invention, it can be implied that if the relative order of rules based on number of links is not in accordance with the order based on actual recall, then the relative loss of recall incurred is bounded by a monotonically decreasing function of T. Such an implication is a consequence of the definitions of Prec(R) and Recall(R), and allows choosing rules based on |links(R)|, which can be advantageous because it does not require a human labeler. Note that, in such an embodiment, the rules are learned under a precision constraint. In particular, the loss in recall is small when the precision threshold τ is large (for example, $1/\tau-1 \approx 0.05$ when $\tau=0.95$). Moreover, such an embodiment can include controlling the degree of loss (increasing T for lower loss).

FIG. 1 is a system diagram for automatic rule learning and example generation, according to an exemplary embodiment of the invention. By way of illustration, FIG. 1 depicts a single-rule learning module (SRLM) 104, which learns an ER rule from labeled examples contained within a set of training data T. FIG. 1 also depicts a rule repository (RR) 114 to store the learned ER rules, and example selection modules (ESM) 110a and 110b, which select pairs to be labeled by a human user.

Throughout the learning process, at least one embodiment of the invention includes maintaining the training set T 102, which includes feature vectors for pairs along with their labels (match/non-match). Unlike other learning applications, T is not static and the system may add or remove examples to direct the learning of rules. Initially, in one or more embodiments of the invention, T can be a small set of pre-labeled examples, possibly obtained by some exploration of the space of matches. The learning process of one or more embodiments of the invention then proceeds in iterations, each divided into two phases: a first phase (depicted in FIG. 1) that includes automatically learning a candidate rule from a current training set followed by choosing examples for the user to label; and a second phase (depicted in FIG. 2 and further detailed below) that includes user interaction, wherein a user labels the chosen examples, followed by updating the training set with the newly provided labels (this phase can also decide whether the candidate rule is accepted or rejected).

As described herein, at least one embodiment of the invention includes differentiating between two kinds of examples: false positives (to refine rules) and false negatives (to improve the overall recall of the ER algorithm). By way of illustration, and referring again to FIG. 1, let R denote the candidate rule 106 learned by the SRLM 104 in an example iteration. To find false positives (as depicted in the upper branch in FIG. 1; that is, via components 106, 110a and 116), ESM 110a chooses one or more links from the candidate ER rule 106 (R), wherein the links most resemble false positives for the user to label. These examples are referred to herein as likely false positives 116 or links with low confidence.

In one or more embodiments of the invention, the candidate rule R 106 will be accepted only if the user ratifies more than T fraction of these examples as matches (that is, if the vast majority of what the system thought as likely false positives 116 turn out to be true matches). Such requirements ensure that only high-precision rules are added to RR 114. Additionally, once a rule has been added, ESM 110a never forwards a link from a subsequent candidate rule R' if it is already covered by an existing rule $R^\dagger$ in RR 114 because $R^\dagger$, being high-precision, is unlikely to cover a false positive.

Compared to likely false positives 116, computing likely false negatives 118 (that is, matches not covered by the current rules) can be more challenging because non-matches tend to outnumber matches in ER. Accordingly, as depicted in FIG. 1, at least one embodiment of the invention includes implementing a rule-minus heuristic 108, which uses rules derived from R 106 to explore links that are not present in links(R) (as illustrated via the lower branch of FIG. 1). Because the goal is to find matches that will eventually lead to new rules that are sufficiently different from previously learned rules, ESM 110b chooses high confidence links that are not covered by R 106 or by rules in RR 114.

Figure 2:
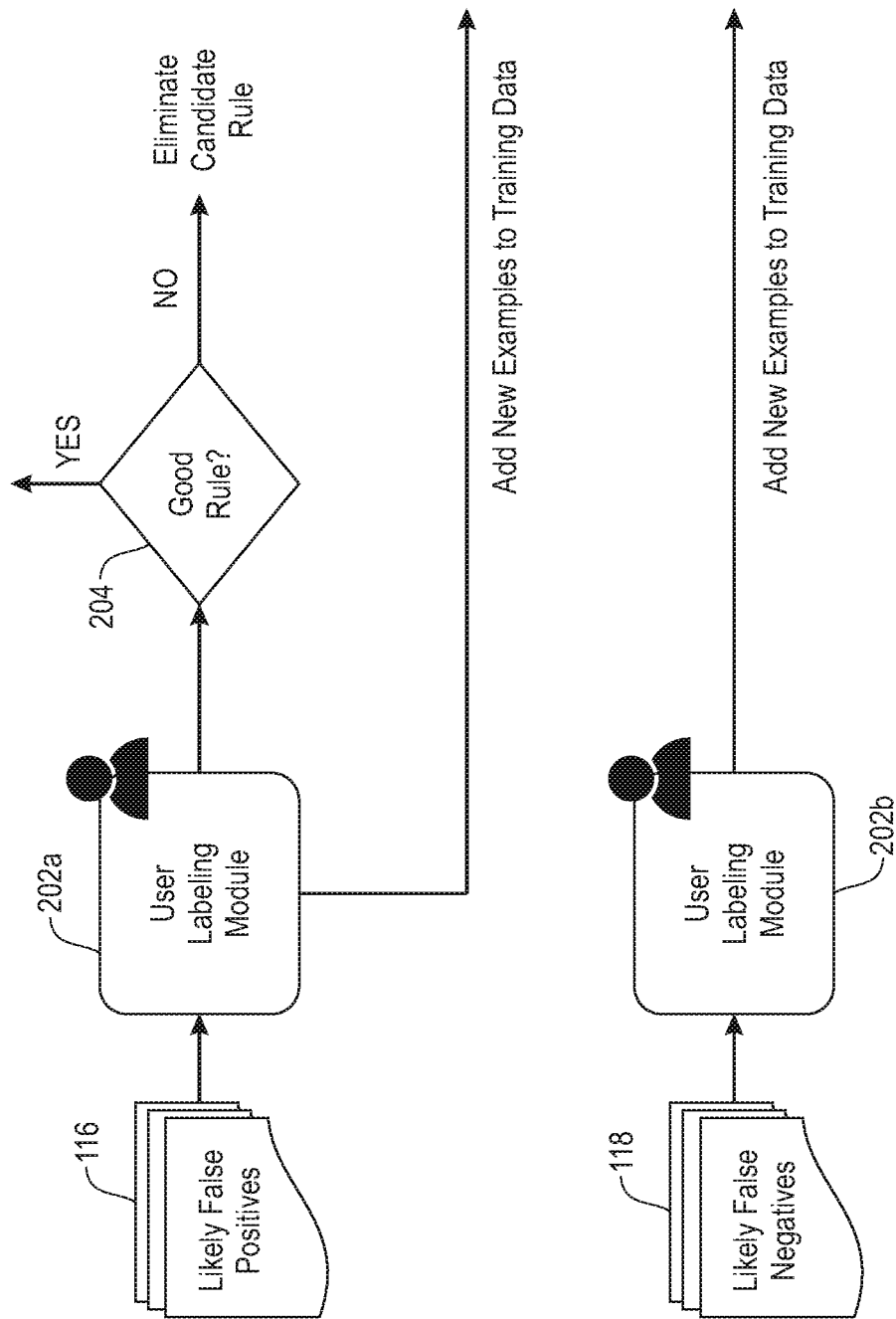
FIG. 2 is a diagram illustrating a user interaction phase, according to an exemplary embodiment of the invention.

FIG. 2 is a diagram illustrating a user interaction phase, according to an exemplary embodiment of the invention. By way of illustration, FIG. 2 depicts a user interaction phase, in which a user labels—via user labeling module 202a—the likely false positive examples 116 chosen by ESM 110a (in FIG. 1), and labels—via user labeling module 202b—the likely false negative examples 118 chosen by ESM 110b (in FIG. 1). The labeled examples are then added to T (102 in FIG. 1) as new labeled feature vectors. In connection with query 204, if a sufficient number of likely false positives were not labeled as matches, then R 106 is rejected; otherwise R 106 is accepted. In the former case, with the newly-labeled examples (in which many non-matches can be expected), at least one embodiment of the invention includes proceeding to the next learning iteration wherein a more refined (more precise) ER rule can be learned. In the latter case, R 106 is included into RR 114 and R's matches are removed from T 102 to ensure that the next iteration learns a rule that covers a new set of matches from T 102, and hence, will be sufficiently different from the previous rule. Such an embodiment can continue iterating until either the user stops the system or the system can no longer find a new rule having precision above a given threshold. The final ER algorithm can be provided based on the disjunction of all rules in RR 114.

FIG. 3 is a diagram illustrating a single-rule learning algorithm 302, according to an exemplary embodiment of the invention. As depicted in FIG. 3, algorithm LearnRule 302 learns a single ER rule containing a sub-set of the available matching predicates $O=\langle P_1, \ldots P_N \rangle$, given the available training data T LearnRule 302 uses labels in the training data instead, and can be seen as a greedy adaption that aims to cover the largest number of positive examples in T among all explored rules. Additionally, the algorithm 302 ensures that the learned rule satisfies certain conditions such as, for example, including a blocking predicate, and satisfying the precision constraint with respect to T.

In the algorithm 302, $T^+$ denotes the set of entries in T that were labeled as a match. LearnRule 302 then converts each such match into a rule R by selecting all features that are true for that match. Initially, R is a very specific rule that possibly satisfies only one match. As used herein, a rule S is a generalization of R if links(R)⊆links(S). LearnRule 302 then explores generalizations of R (via the procedure Generalize at Line 7 of FIG. 3) by removing predicates to improve its coverage of matches in T In general, to maximize coverage of matches, an optimal algorithm would need to explore the power set of $O$. By employing pruning strategies within the Generalize procedure, LearnRule's worst case time complexity is reduced to having a quadratic dependence on the number of predicates in O instead of being exponential.

One of the strategies used by at least one embodiment of the invention includes finding the predicate from R which leads to the highest coverage of matches in T among all of the sub-rules of R that drop a single predicate, and then continuing only with the resulting rule for further generalization. Additionally, one or more embodiments of the invention can include only considering rules that contain a blocking predicate and satisfy the precision constraint $Prec_T(R) = |T + \cap links_T(R)|/|T \cap links_T(R)| \geq \tau$, wherein $links_T(R)$ denotes the sub-set of T covered by R. In particular, whenever a rule is encountered that does not satisfy the precision constraint (that is, that has been generalized too much), such an embodiment can include stopping exploration of any of that rule's sub-rules. LearnRule 302 ultimately returns the (generalized) rule with highest coverage of $T^+$ among all of the explored rules.

At least one embodiment of the invention can additionally include implementing active learning to improve precision. Because T is commonly a small training set, $Prec_T(R) \geq \tau$ may not necessarily imply $Prec(R) \geq \tau$ on $D_1 \times D_2$, for a rule R learned by LearnRule 302. In other words, R may over-fit on a small T Thus, as a candidate rule R is learned, one or more embodiments of the invention includes accurately estimating its generalization performance on data not used to learn it; that is, on $D_1 \times D_2 \setminus T$. Conventional approaches can include use of a k-sized random sample $S \subseteq links(R)$ to estimate generalization performance of a rule R; however, this allows for the possibility that $Prec(R) \geq \tau$ on S but not on $D_1 \times D_2$, especially for small k. Accordingly, one or more embodiments of the invention can include using a biased sample with low confidence links of R (or likely false positives). Approaches for choosing low confidence (or adversarial) links are detailed below.

One or more embodiments of the invention can include estimating link confidence via a bootstrap, a statistical technique that can assign confidence to a statistic (such as, for example, the label of a pair). To apply a bootstrap, construct K |T|-sized training sets $\{T^I, \ldots T^K\}$ by uniformly sampling at random from T with replacement(s), which may lead to repeated inclusion of a labeled pair from T into $T^i$. Each $T^i$ can be used to produce a rule $R^i$=LearnRule($T^i$, $\tau$). To estimate confidence of a pair (r, s) in links(R), wherein R is the rule learned from T, at least one embodiment of the invention can include counting how many of the $R^i$'s yield the same pair: $conf_{BS}(r,s) = \Sigma_i \delta_{R^i}(r,s)/K$, wherein $\delta_{R^i}(r,s)=1$ if (r, s) satisfies $R^i$, and 0 otherwise. The k-lowest confidence links form the biased sample of adversarial links whose human-assigned labels can be used to estimate Prec(R).

Alternatively, one or more embodiments of the invention include using a similarity measure that estimates confidence directly from the link (r, s) by measuring how well r matches s. This alternate technique has the advantage that it applies equally well in finding likely false negatives. Also, at least one embodiment of the invention includes assuming that all matching predicates in O measure quality of the match rather than its counter-positive. For instance, as opposed to S.lastname=C.lastname, S.lastname≠C.lastname does not measure the quality of the match and one or more embodiments of the invention do not allow the latter. Accordingly, a heuristic to estimate the confidence of link (r, s) in such a setting can include counting the satisfying predicates: $conf_{SIM}(r,s) = \Sigma_{P \in O} \delta_P(r,s)/|O|$. In the user interaction phase (as depicted in FIG. 2), the user can be queried to label the k-lowest confidence links. If $Prec(R) \geq \tau$ on these low-confidence links, then R can be accepted. Otherwise, such an embodiment includes proceeding to the next iteration to learn an improved rule using the newly-labeled examples added to the training set.

One or more embodiments of the invention can also include implementing active learning to discover unseen matches. To search for and/or determine false negatives, at least one embodiment of the invention includes exploring the pairs of records that are uncovered (that is, not produced) by the existing rules. Such an embodiment can include developing and/or implementing a rule-minus heuristic to actively search for candidates of false negatives by systematically expanding from a search space of covered pairs.

One or more embodiments of the invention can include discovering unseen matches (or false negatives) without enumerating $D_1 \times D_2$ by focus on regions that are likely to have a higher concentration of matches. Such an embodiment can include the utilization of the notion of a generalization of a rule. By way of illustration, given R and jump size $j \geq 1$ (a small number), let $R^-(j)$ be a rule-minus rule obtained by dropping at most j predicates from R. While a rule can have many generalizations, one or more embodiments of the invention can include restricting attention to generalizations containing blocking predicates. Such an embodiment includes denoting, by RM(R, j), the set of rule-minus rules that can be obtained in such a way.

Additionally, consider links ($R^-$)\L, wherein $R^- \in RM(R, j)$, R denotes the candidate rule, and L contains the links covered by R and the rules in the rule repository. At least one embodiment of the invention can include hypothesizing that links($R^-$)\L harbors a higher concentration of matches relative to other areas of $D_1 \times D_2 \setminus L$. As such, such an embodiment can include proposing a rule-minus heuristic, which selects a small sample from links ($R^-$)\L for labeling. The set of (at most j) predicates included in R but not in $R^-$ can be denoted by P. Also, because any (r,s)∈links($R^-$)\L satisfies all predicates in R barring P, (r, s) is more likely to be a match than a pair chosen arbitrarily which may not satisfy even a single predicate in R. Intuitively, $R^-$ is a minor perturbation of R and a link resulting from $R^-$ is more likely to be a match than any pair from the much larger space $D_1 \times D_2$. Procedurally, one or more embodiments of the invention can include selecting the top-m high confidence links (using $conf_{SIM}$) from each rule-minus rule of the candidate rule R, while ensuring that none of these confidence links are covered by R or any of the rules in the rule repository. These links can then be sent to the user for labeling (such as depicted in the lower branch of FIG. 2).

Besides combining the top-m links from each rule-minus rule, one or more embodiments of the invention can also include performing a union of the links from all rules before selecting the top few. By performing the union after choosing top-m, at least one embodiment of the invention includes preserving links from every rule-minus rule, thus exploring different parts of the search space. As noted and used above, jump size j controls the size of the region for which unseen matches are searched. While increasing j increases the size of the explored search space via more general rule-minus rules, increasing j can also result in exploring regions of lower match concentration.

Figure 4:
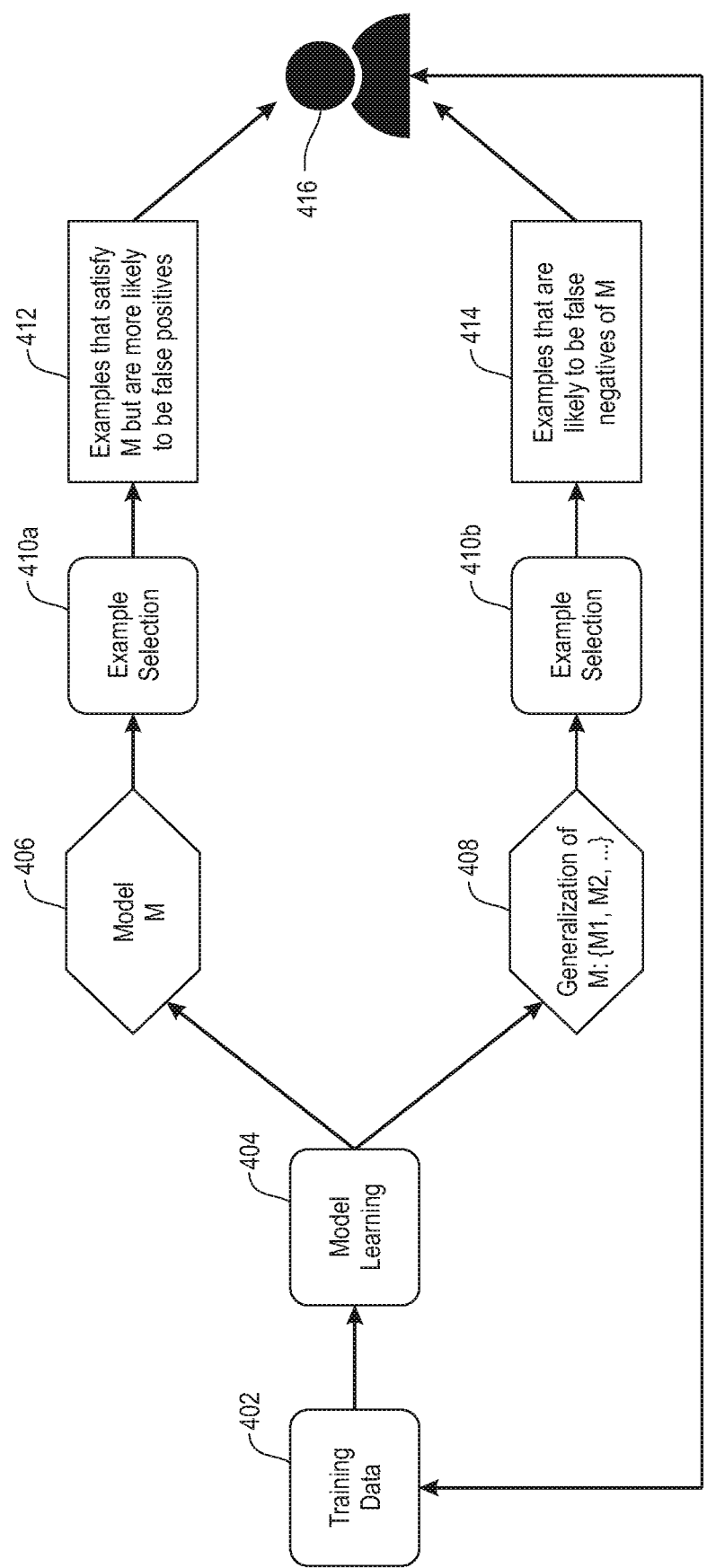
FIG. 4 is a flow diagram illustrating techniques according to an embodiment of the invention.

FIG. 4 is a flow diagram illustrating techniques according to an embodiment of the invention. By way of illustration, FIG. 4 depicts steps carried out by an active learning system for learning models for sub-tasks used in structured knowledge base creation. As illustrated in FIG. 4, one or more embodiments of the invention include learning a model G that implements a task, wherein the task is defined, semantically, by a set of data items that satisfy one or more user requirements. The models considered by such an embodiment can either accept or reject particular data items. One goal of such an embodiment includes learning a model that captures the semantic definition of a particular task, which can mean that if G accepts a data item I, then I is likely to satisfy the one or more user requirements (which can be measured by the precision of the model). Conversely, if G does not accept particular data item I, then I is unlikely to satisfy the one or more user requirements (which can be measured by the recall of the model). As detailed herein, methods such as depicted in FIG. 4 can be applied to learn models for multiple tasks in knowledge base creation such as entity resolution, relationship identification, etc.

Referring again to FIG. 4, a set of training data 402 (for example, data items labeled by a user as either to be accepted or rejected) is provided to a model learning module 404, which uses the training data 402 to learn a candidate model M, together with multiple generalizations of M (that is, additional models $M_1, \ldots, M_k$, wherein each additional model accepts a superset of items accepted by M). The workflow depicted in FIG. 4 then splits into two branches (an upper branch and a lower branch, as illustrated in FIG. 4).

With respect to the upper branch, given the candidate model M 406 generated by model learning module 404, example selection module 410a searches for examples of data items that are accepted by M but are likely to be incorrect; that is, likely false positives (LFP) 412. Part of the intuition behind this upper branch of FIG. 4 is that one or more embodiments of the invention includes attempting to find examples that can falsify the candidate model M If such examples cannot be found, the candidate model M can be assumed to have a high level of precision. Otherwise, the false positives 412 that were found can be used in the next iteration to learn a new candidate model with enhanced precision.

With respect to the lower branch of FIG. 4, given a set of generalized versions of M 408, example selection module 410b is implemented to find examples that are likely to be positive according to a semantic task, but are not accepted by M; that is, likely false negatives (LFN) 414. Part of the intuition behind this lower branch of FIG. 4 is that one or more embodiments of the invention includes attempting to find examples that are not captured by the initial training data and the previously-learned model, but are likely to satisfy the user requirements of the task. If such false negative examples cannot be found, the candidate model M is assumed to have a high level of recall.

Referring again to FIG. 4, the LFP examples 412 and the LFN examples 414 can be provided and/or presented to a human user 416 to be labeled. All newly-labeled examples can be added to the training data 402 for use in the next learning iteration to learn a refined model. The workflow depicted in FIG. 4 can be terminated by the user 416 or by some pre-defined termination criteria (for example, when neither LFP examples nor LFM examples can be found).

Figure 5:
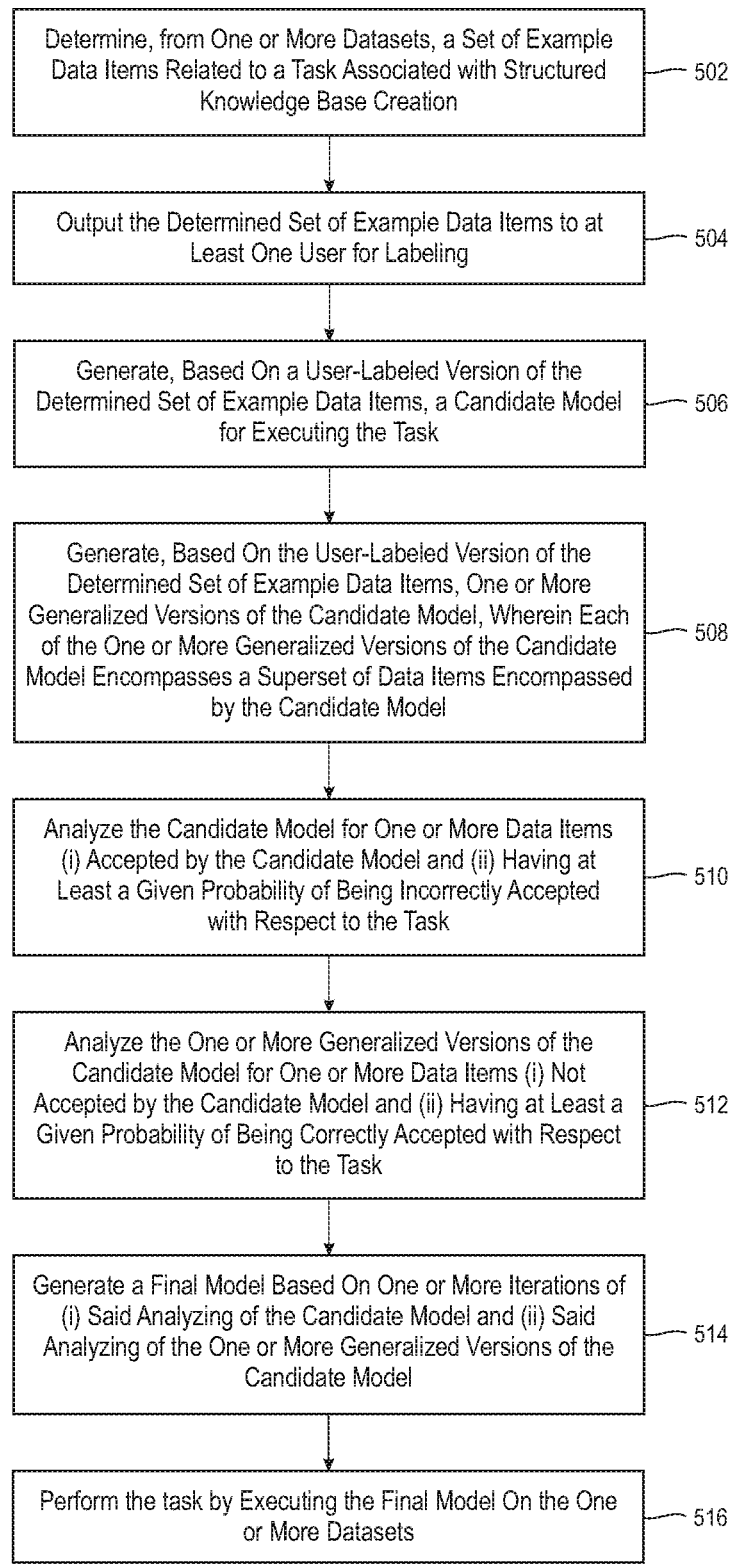
FIG. 5 is a flow diagram illustrating techniques according to an embodiment of the invention.

FIG. 5 is a flow diagram illustrating techniques according to an embodiment of the present invention. Step 502 includes determining, from one or more datasets, a set of example data items related to a task associated with structured knowledge base creation. The task can include a task that is semantically-defined by a set of data items that satisfy one or more user requirements. For example, the task can include entity resolution, relationship identification, etc.

Step 504 includes outputting the determined set of example data items to at least one user for labeling. Step 506 includes generating, based on a user-labeled version of the determined set of example data items, a candidate model for executing the task. The user-labeled version of the determined set of example data items can include, for example data items labeled as at least one of satisfying one or more user requirements of the task and not satisfying the one or more user requirements of the task.

Step 508 includes generating, based on the user-labeled version of the determined set of example data items, one or more generalized versions of the candidate model, wherein each of the one or more generalized versions of the candidate model encompasses a superset of data items encompassed by the candidate model.

Step 510 includes analyzing the candidate model for one or more data items (i) accepted by the candidate model and (ii) having at least a given probability of being incorrectly accepted with respect to the task. Step 512 includes analyzing the one or more generalized versions of the candidate model for one or more data items (i) not accepted by the candidate model and (ii) having at least a given probability of being correctly accepted with respect to the task.

Step 514 includes generating a final model based on one or more iterations of (i) said analyzing of the candidate model and (ii) said analyzing of the one or more generalized versions of the candidate model. The one or more iterations can include a number of iterations until no data items can be identified that (i) are accepted by the candidate model and (ii) have at least the given probability of being incorrectly accepted with respect to the task, and no data items can be identified that (a) are not accepted by the candidate model and (b) have at least the given probability of being correctly accepted with respect to the task.

Step 516 includes performing the task by executing the final model on the one or more datasets. The techniques depicted in FIG. 5 can also include outputting, to at least one user for labeling, the one or more data items (i) accepted by the candidate model and (ii) having at least the given probability of being incorrectly accepted with respect to the task. Further, at least one embodiment of the invention can include outputting, to at least one user for labeling, the one or more data items (i) not accepted by the candidate model and (ii) having at least the given probability of being correctly accepted with respect to the task.

Also, an additional embodiment of the invention includes generating one or more generalized versions of an existing candidate model for executing a task associated with structured knowledge base creation across one or more datasets, wherein each of the one or more generalized versions of the candidate model encompasses a superset of data items encompassed by the existing candidate model. Such an embodiment can also include outputting, to at least one user for labeling, (i) the data items encompassed by the existing candidate model and (ii) the superset of data items encompassed by each of the one or more generalized versions of the existing candidate model. Further, such an embodiment can include generating, based on user-labeling of (i) the data items encompassed by the existing candidate model and (ii) the superset of data items encompassed by each of the one or more generalized versions of the existing candidate model, a revised version of the existing candidate model for executing the task. Such an embodiment additionally includes performing the task by executing the revised version of the existing candidate model on the one or more datasets.

The techniques depicted in FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 6:
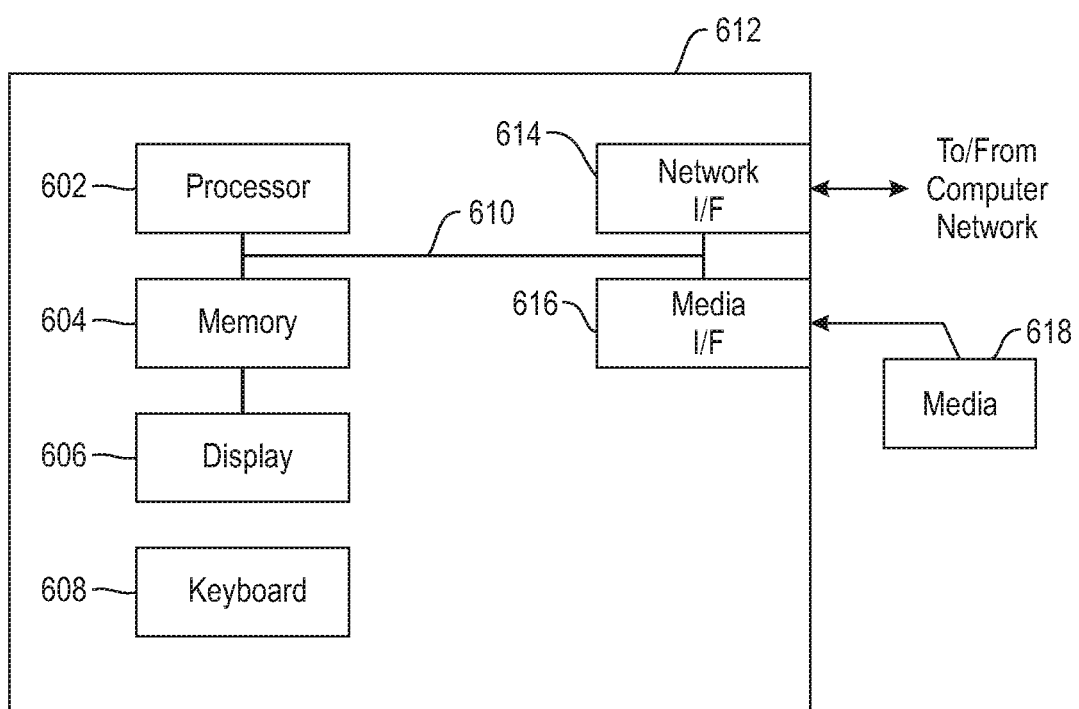
FIG. 6 is a system diagram of an exemplary computer system on which at least one embodiment of the invention can be implemented.

Additionally, an embodiment of the present invention can make use of software running on a computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
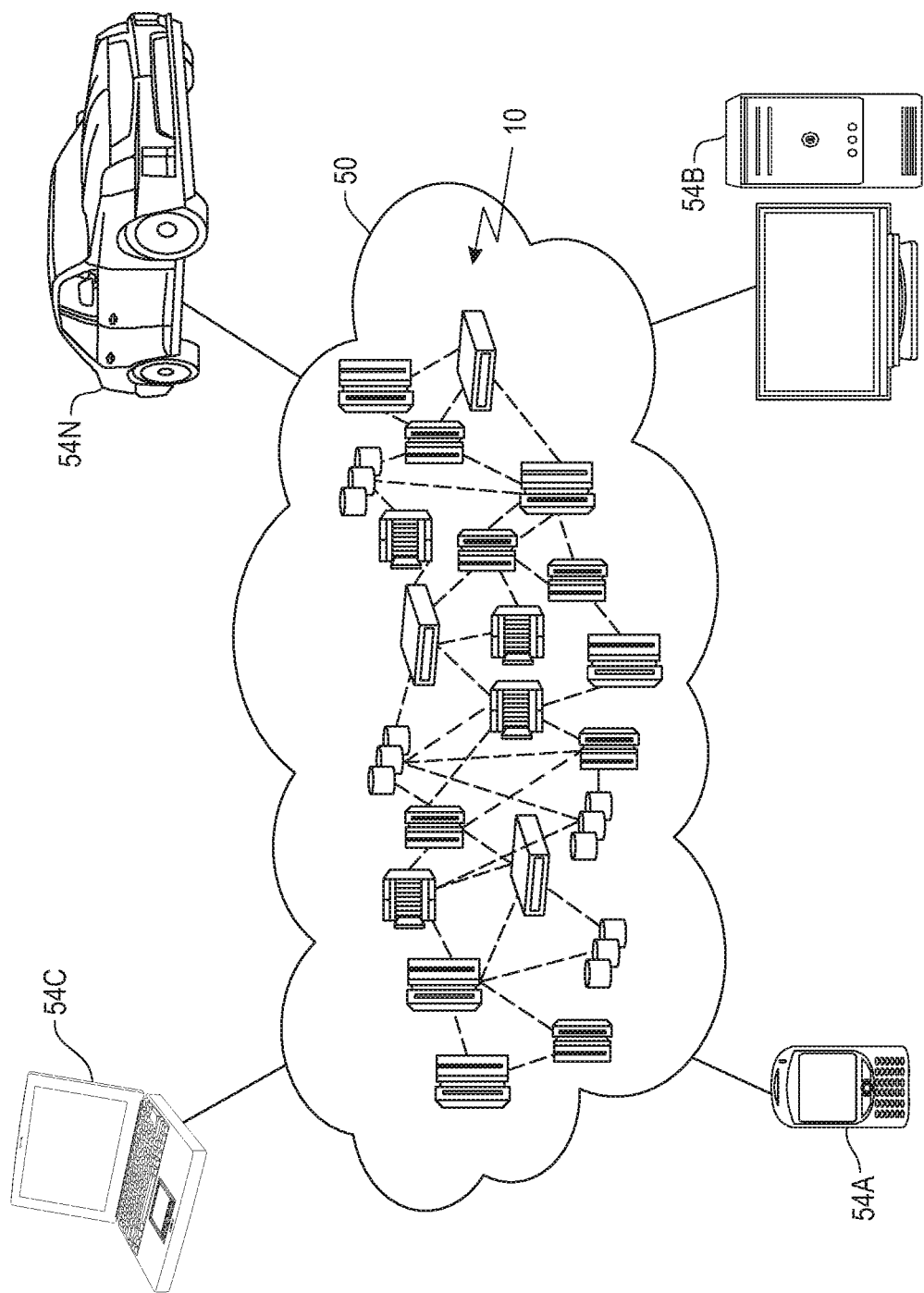
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
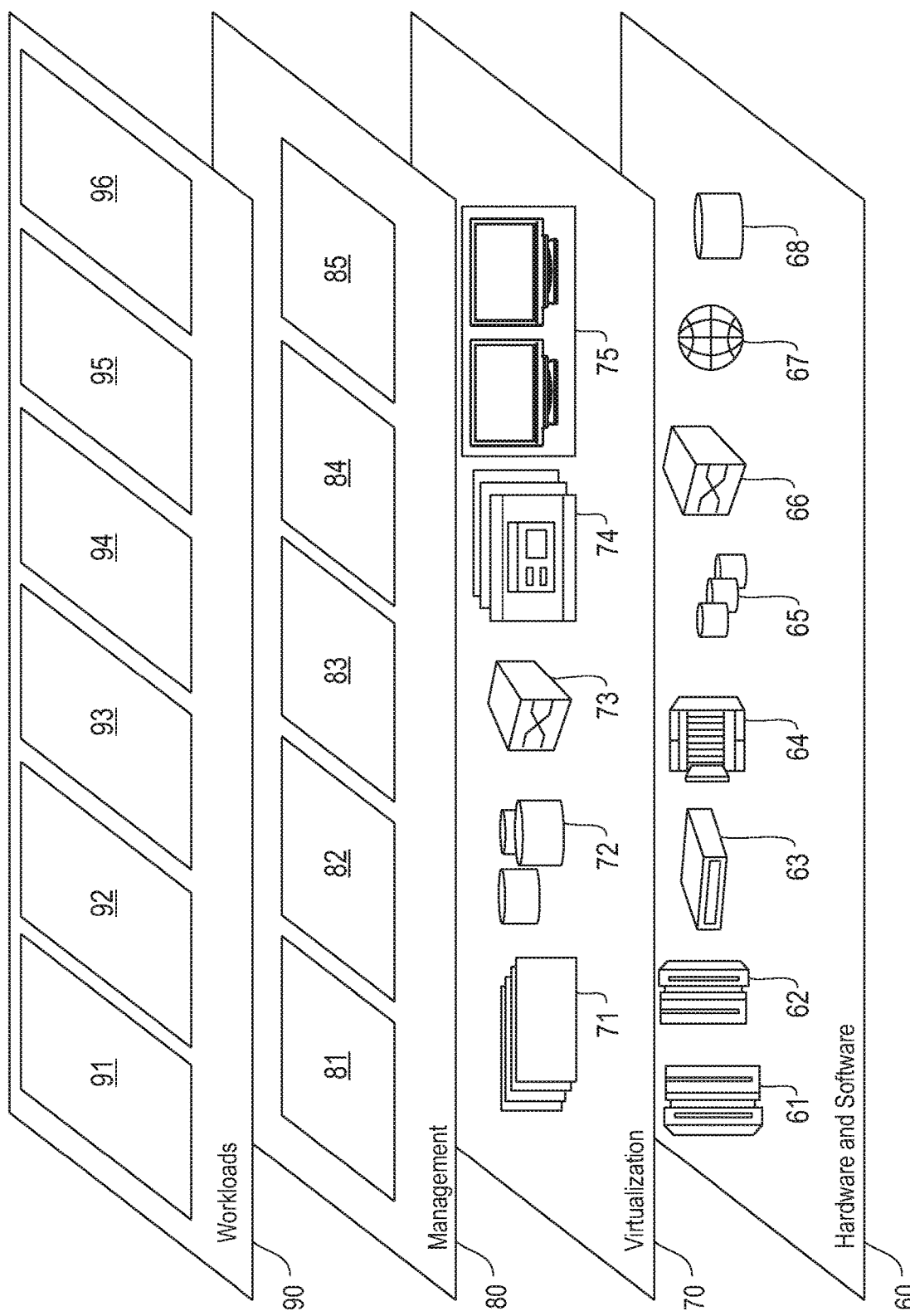
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and active learning-based entity resolution 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, learning a model that includes multiple rules usable with large datasets, providing quality control over the precision of the learned model.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising steps of:
    determining, from one or more datasets, a set of example data items related to a task associated with structured knowledge base creation;
    outputting the determined set of example data items to at least one user for labeling;
    generating, based on a user-labeled version of the determined set of example data items, a candidate model for executing the task;
    generating, based on the user-labeled version of the determined set of example data items, one or more generalized versions of the candidate model, wherein each of the one or more generalized versions of the candidate model encompasses a superset of data items encompassed by the candidate model;
    analyzing the candidate model for one or more data items (i) accepted by the candidate model and (ii) having at least a given probability of being incorrectly accepted with respect to the task;
    analyzing the one or more generalized versions of the candidate model for one or more data items (i) not accepted by the candidate model and (ii) having at least a given probability of being correctly accepted with respect to the task;
    generating a final model based on one or more iterations of (i) said analyzing of the candidate model and (ii) said analyzing of the one or more generalized versions of the candidate model; and
    performing the task by executing the final model on the one or more datasets;
    wherein the steps are carried out by at least one computing device.

2. The computer-implemented method of claim 1, wherein the one or more iterations comprise a number of iterations until:
    no data items can be identified that (i) are accepted by the candidate model and (ii) have at least the given probability of being incorrectly accepted with respect to the task; and
    no data items can be identified that (a) are not accepted by the candidate model and (b) have at least the given probability of being correctly accepted with respect to the task.

3. The computer-implemented method of claim 1, comprising:
    outputting, to at least one user for labeling, the one or more data items (i) accepted by the candidate model and (ii) having at least the given probability of being incorrectly accepted with respect to the task.

4. The computer-implemented method of claim 1, comprising:
    outputting, to at least one user for labeling, the one or more data items (i) not accepted by the candidate model and (ii) having at least the given probability of being correctly accepted with respect to the task.

5. The computer-implemented method of claim 1, wherein the task comprises a task that is semantically-defined by a set of data items that satisfy one or more user requirements.

6. The computer-implemented method of claim 1, wherein the task comprises entity resolution.

7. The computer-implemented method of claim 1, wherein the task comprises relationship identification.

8. The computer-implemented method of claim 1, wherein the user-labeled version of the determined set of example data items comprise data items labeled as at least one of: (i) satisfying one or more user requirements of the task and (ii) not satisfying the one or more user requirements of the task.

9. A computer program product comprising a non-transitory computer readable storage medium having program instructions embodied therewith, the program instructions executable by a computing device to cause the computing device to:
    determine, from one or more datasets, a set of example data items related to a task associated with structured knowledge base creation;
    output the determined set of example data items to at least one user for labeling;

generate, based on a user-labeled version of the determined set of example data items, a candidate model for executing the task;

generate, based on the user-labeled version of the determined set of example data items, one or more generalized versions of the candidate model, wherein each of the one or more generalized versions of the candidate model encompasses a superset of data items encompassed by the candidate model;

analyze the candidate model for one or more data items (i) accepted by the candidate model and (ii) having at least a given probability of being incorrectly accepted with respect to the task;

analyze the one or more generalized versions of the candidate model for one or more data items (i) not accepted by the candidate model and (ii) having at least a given probability of being correctly accepted with respect to the task;

generate a final model based on one or more iterations of (i) said analyzing of the candidate model and (ii) said analyzing of the one or more generalized versions of the candidate model; and perform the task by executing the final model on the one or more datasets.

10. The computer program product of claim 9, wherein the one or more iterations comprise a number of iterations until:
   no data items can be identified that (i) are accepted by the candidate model and (ii) have at least the given probability of being incorrectly accepted with respect to the task; and
   no data items can be identified that (a) are not accepted by the candidate model and (b) have at least the given probability of being correctly accepted with respect to the task.

11. The computer program product of claim 9, wherein the program instructions further cause the computing device to:
   output, to at least one user for labeling, the one or more data items (i) accepted by the candidate model and (ii) having at least the given probability of being incorrectly accepted with respect to the task.

12. The computer program product of claim 9, wherein the program instructions further cause the computing device to:
   output, to at least one user for labeling, the one or more data items (i) not accepted by the candidate model and (ii) having at least the given probability of being correctly accepted with respect to the task.

13. The computer program product of claim 9, wherein the task comprises a task that is semantically-defined by a set of data items that satisfy one or more user requirements.

14. The computer program product of claim 9, wherein the task comprises entity resolution.

15. The computer program product of claim 9, wherein the task comprises relationship identification.

16. The computer program product of claim 9, wherein the user-labeled version of the determined set of example data items comprise data items labeled as at least one of: (i) satisfying one or more user requirements of the task and (ii) not satisfying the one or more user requirements of the task.

17. A system comprising:
   a memory; and
   at least one processor operably coupled to the memory and configured for:
      determining, from one or more datasets, a set of example data items related to a task associated with structured knowledge base creation;

outputting the determined set of example data items to at least one user for labeling;

generating, based on a user-labeled version of the determined set of example data items, a candidate model for executing the task;

generating, based on the user-labeled version of the determined set of example data items, one or more generalized versions of the candidate model, wherein each of the one or more generalized versions of the candidate model encompasses a superset of data items encompassed by the candidate model;

analyzing the candidate model for one or more data items (i) accepted by the candidate model and (ii) having at least a given probability of being incorrectly accepted with respect to the task;

analyzing the one or more generalized versions of the candidate model for one or more data items (i) not accepted by the candidate model and (ii) having at least a given probability of being correctly accepted with respect to the task;

generating a final model based on one or more iterations of (i) said analyzing of the candidate model and (ii) said analyzing of the one or more generalized versions of the candidate model; and performing the task by executing the final model on the one or more datasets.

18. A computer-implemented method, the method comprising steps of:
   generating one or more generalized versions of an existing candidate model for executing a task associated with structured knowledge base creation across one or more datasets, wherein each of the one or more generalized versions of the candidate model encompasses a superset of data items encompassed by the existing candidate model;

outputting, to at least one user for labeling, (i) the data items encompassed by the existing candidate model and (ii) the superset of data items encompassed by each of the one or more generalized versions of the existing candidate model;

generating, based on user-labeling of (i) the data items encompassed by the existing candidate model and (ii) the superset of data items encompassed by each of the one or more generalized versions of the existing candidate model, a revised version of the existing candidate model for executing the task; and performing the task by executing the revised version of the existing candidate model on the one or more datasets;

wherein the steps are carried out by at least one computing device.

19. The computer-implemented method of claim 18, wherein the task comprises a task that is semantically-defined by a set of data items that satisfy one or more user requirements.

20. The computer-implemented method of claim 18, wherein the task comprises entity resolution.

21. The computer-implemented method of claim 18, wherein the task comprises relationship identification.

22. A computer program product comprising a non-transitory computer readable storage medium having program instructions embodied therewith, the program instructions executable by a computing device to cause the computing device to:
   generate one or more generalized versions of an existing candidate model for executing a task associated with structured knowledge base creation across one or more datasets, wherein each of the one or more generalized versions of the candidate model encompasses a superset of data items encompassed by the existing candidate model;

output, to at least one user for labeling, (i) the data items encompassed by the existing candidate model and (ii) the superset of data items encompassed by each of the one or more generalized versions of the existing candidate model;

generate, based on user-labeling of (i) the data items encompassed by the existing candidate model and (ii) the superset of data items encompassed by each of the one or more generalized versions of the existing candidate model, a revised version of the existing candidate model for executing the task; and perform the task by executing the revised version of the existing candidate model on the one or more datasets.

23. The computer program product of claim 22, wherein the task comprises a task that is semantically-defined by a set of data items that satisfy one or more user requirements.

24. The computer program product of claim 22, wherein the task comprises at least one of entity resolution and relationship identification.

25. The computer-implemented method of claim 1, wherein software implementing the method is provided as a service in a cloud environment.

* * * * *